（12） United States Patent
Baugh et al.

(10) Patent No.: US 6,839,026 B2
(45) Date of Patent: ***Jan. 4, 2005

(54) SYSTEM AND METHOD FOR NARROWBAND PRE-DETECTION SIGNAL PROCESSING FOR PASSIVE COHERENT LOCATION APPLICATIONS

(75) Inventors: Kevin W. Baugh, Gaithersburg, MD (US); Robert H. Benner, Gaithersburg, MD (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,509

(22) Filed: May 6, 2002

(65) Prior Publication Data

US 2003/0020653 A1 Jan. 30, 2003

Related U.S. Application Data

(60) Provisional application No. 60/288,452, filed on May 4, 2001.

(51) Int. Cl.[7] .............................. G01S 3/02; G01S 3/16
(52) U.S. Cl. ...................................................... 342/451
(58) Field of Search ................................. 342/450, 451, 342/452, 378

(56) References Cited

U.S. PATENT DOCUMENTS

| | | | | |
|---|---|---|---|---|
| 3,721,986 A | * | 3/1973 | Kramer | ....................... 342/453 |
| 4,644,356 A | * | 2/1987 | Yamano | ....................... 342/160 |
| 5,252,980 A | * | 10/1993 | Gray et al. | .................... 342/59 |
| 5,604,503 A | * | 2/1997 | Fowler et al. | ............... 342/378 |
| 6,424,290 B1 | * | 7/2002 | O'Neil et al. | ................. 342/55 |
| 6,522,295 B2 | * | 2/2003 | Baugh et al. | ................ 342/453 |

FOREIGN PATENT DOCUMENTS

EP 0 422 479 A2 4/1991

* cited by examiner

*Primary Examiner*—Dao Phan
(74) *Attorney, Agent, or Firm*—Marsh Fischmann & Breyfogle LLP (57) ABSTRACT

A system and method for narrowband pre-detection signal processing in passive coherent location applications is disclosed. A receiving subsystem receives a reference signal and a target signal from an uncontrolled transmitter. The target signal is reflected from a target. The passive coherent location system includes sub-processors that perform pre-detection operations on the reference and target signals. The functions include zero-doppler cancellation, quadrature demodulation, reference beam regeneration, coherent processing interval selection, power spectral density estimation, cross ambiguity function formation, and the like. Within these operations, the reference signal is filtered with respect to the target signal to form a first output reference signal. The first output reference signal is combined with the first target signal to form a first output target signal. The output target signal then is used for subsequent passive coherent location processing operations. The filter is updated with respect to a difference between the target signal and a subsequent target signal. Further, two paths are used for correlation processing of the reference and target signals.

19 Claims, 5 Drawing Sheets

SYSTEM AND METHOD FOR NARROWBAND PRE-DETECTION SIGNAL PROCESSING FOR PASSIVE COHERENT LOCATION APPLICATIONS

CROSS REFERENCE TO RELATED APPLICATIONS

This application claims benefit of U.S. Provisional Patent Application No. 60/288,452 entitled System and Method for Narrowband Pre-Detection Signal Processing for PCL Applications, filed May 4, 2001 that is hereby incorporated by reference.

BACKGROUND OF THE INVENTION

1. Field of the Invention

The present invention relates to a passive coherent location (PCL) system, and more particularly, to a system and method for narrowband pre-detection signal processing for PCL applications.

2. Discussion of the Related Art

Radar systems detect the presence of a target of interest and provide information about that target. Conventional radar systems include pulsed radar and continuous wave radar. In pulsed radar, the measure of target distance is determined by the measurement of the time elapsed from the transmission of an electromagnetic energy pulse to the reception of its reflected energy. In continuous wave radar, a continuous wave is transmitted. The target distance is determined through the measurement of the frequency shift between the transmitted signal and the received reflected signal.

Conventional radar systems transmit electromagnetic energy. A portion of the transmitted electromagnetic energy is reflected off a target of interest and scattered in the space. The radar system receives the reflected energy and extracts the information about the target of interest by correlating the received reflected energy with replicas of the transmitted energy.

SUMMARY OF THE INVENTION

Accordingly, the present invention is directed to a PCL application and method for signal processing for PCL application.

A system and method for narrowband pre-detection signal processing in passive coherent location applications is disclosed. A receiving subsystem receives a reference signal and a target signal from an uncontrolled transmitter. The target signal is reflected from a target. The passive coherent location system includes sub-processors that perform pre-detection operations on the reference and target signals. The functions include zero-doppler cancellation, quadrature demodulation, reference beam regeneration, coherent processing interval selection, power spectral density estimation, cross ambiguity function formation, and the like. Within these operations, the reference signal is filtered with respect to the target signal to form a first output reference signal. The first output reference signal is combined with the first target signal to form a first output target signal. The output target signal then is used for subsequent passive coherent location processing operations. The filter is updated with respect to a difference between the target signal and a subsequent target signal. Further, two paths are used for correlation processing of the reference and target signals.

Additional features and advantages of the invention will be set forth in the description that follows, and in part will be apparent from the description, or may be learned by practice of the invention. The objectives and other advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide further understanding of the invention and are incorporated in and constitutes a part of this specification, illustrate embodiments of the invention and together with the description serves to explain the principles of the invention. In the drawings.

DETAILED DESCRIPTION OF THE PREFERRED EMBODIMENTS

Reference will now be made in detail to the preferred embodiment of the present invention, examples of which are illustrated in the accompanying drawings.

Passive coherent location ("PCL") systems are passive surveillance systems that utilizes multi-static wide area moving target surveillance sensors. PCL technology provides detection capability without transmitting energy at the targets of interest.

Passive radar systems, in contrast to conventional radar systems, exploit electromagnetic energy transmitted from uncontrolled illuminators, such as commercial broadcast frequency-modulated ("FM") radio signals and television broadcast signals. Passive radar systems receive reflected signals that are the signals transmitted from uncontrolled illuminators and reflected off the target of interest, and direct path signals from the uncontrolled illuminators. The passive radar systems extract the information about the target of interest by correlating the received reflected signals with the received direct path signals.

Figure 1:
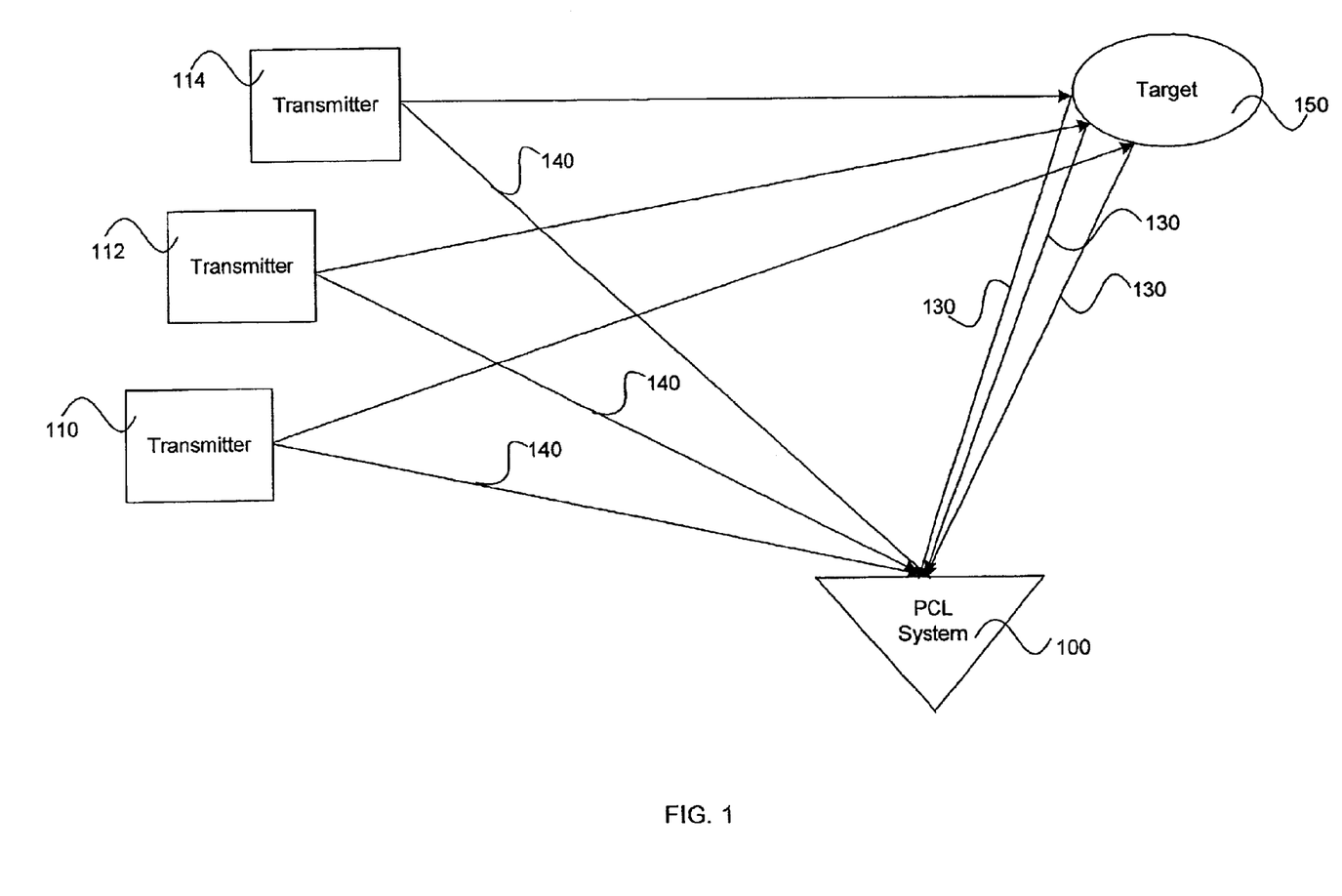
FIG. 1 illustrates a block diagram of a passive coherent location system, a target and a plurality of transmitters in accordance with an embodiment of the present invention.

FIG. 1 depicts a block diagram of a PCL system, a target, and a plurality of transmitters in accordance with an embodiment of the present invention. FIG. 1 depicts a plurality of uncontrolled illuminators, or transmitters, 110, 112 and 114, a target of interest 150 and a PCL system 100. Transmitters 110, 112 and 114 may include uncontrolled narrowband illuminators, such as navigation aid transmitters and/or repeaters and commercial television ("TV") broadcast transmitters and/or repeaters. Target 150 may be an aircraft.

Transmitters 110, 112 and 114 transmit electromagnetic energy signals in all directions. Some of the transmitted signals are reflected by target 150 and scattered. PCL system 100 may receive some of the scattered signals, referred to as target path signals 130. Further, PCL system 100 receives some of the signals directly from transmitters 110, 112 and 114. These signals may be known as reference path, or direct path, signals 140.

Figure 2:
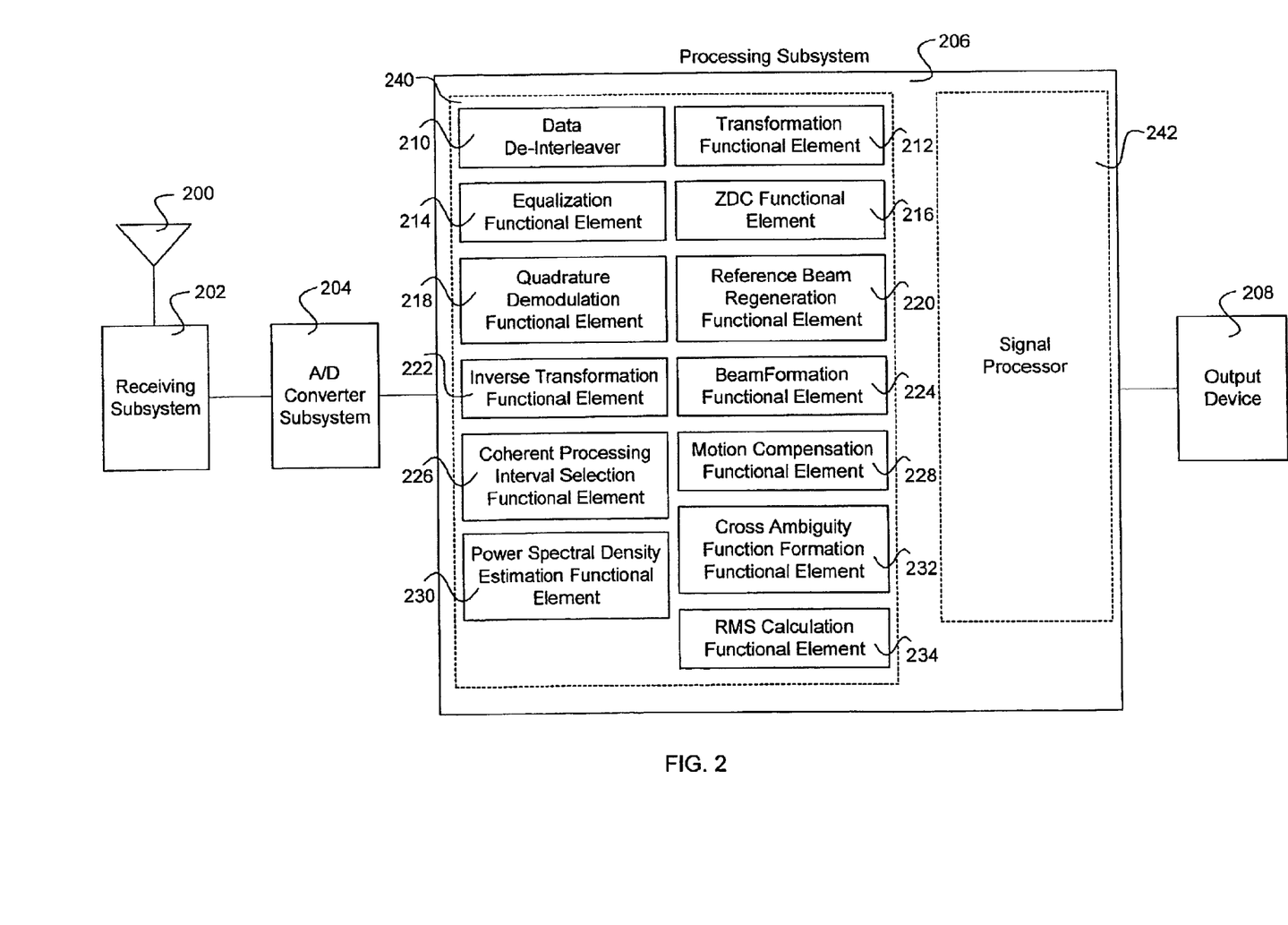
FIG. 2 illustrates a block diagram of a passive coherent location system in accordance with an embodiment of the present invention.

FIG. 2 depicts of PCL system 100 in accordance with an embodiment of the present invention. PCL system 100 includes an antenna 200, a receiving subsystem 202, an A/D converter subsystem 204, a processing subsystem 206, and a display 208. PCL system 100 receives signals transmitted from uncontrolled transmitters.

Antenna 200 receives reference path signal 140 from uncontrolled illuminators, including transmitters 110, 112, and 114. Antenna 200 also receives target path signal 130 reflected from target 150. Antenna 200 communicates reference path signal 140 and target path signal 130 to receiving subsystem 202.

Receiving subsystem 202 receives and processes reference path signal 140 and target path signal 130 from antenna 200. Receiving subsystem 202 may include a transducer. A/D converter subsystem 204 receives the output of receiving subsystem 202 and outputs digital samples of the signals by sampling the signals at a desired sampling rate. A/D connector subsystem 204 forms a digital waveform using the magnitude of the analog signals at each sampling time. A/D converter subsystem 204 may include an amplifier to amplify the received signal.

Processing subsystem 206 receives the digital samples of the received signals from A/D converter subsystem 204. Processing subsystem 206 processes received reference signal 140 and target signal 130 to extract information about target interest 150. The processed information may include location, velocity, and acceleration information relating to a position of target 150.

Processing subsystem 206 may include sub-processors. The sub-processors may include a pre-detection signal processor 240 for removing errors to provide optimized signals and a signal processor 242 to extract information about target 150. Pre-detection signal processor 240 performs the operations required to present estimated power spectral density ("PSD") or cross ambiguity function ("CAF") to detection processing. Pre-detection signal processor 240 may include data de-interlever functional element 210, transformation functional element 212, equalization functional element 214, zero-doppler cancellation ("ZDC") functional element 216, quadrature demodulation functional element 218, reference beam regeneration functional element 220, inverse transformation functional element 222, beam formation functional element 224, coherent processing interval ("CPI") selection functional element 226, motion compensation functional element 228, power spectral density ("PSD") estimation functional element 230, cross ambiguity function ("CAF") formation functional element 232, and RMS calculation functional element 234. Processing subsystem 200 may include a high performance computer with data storage capabilities that is programmed to perform the functions of the various disclosed elements. Alternatively, hardware elements may be used as some or as all of the elements of the pre-detection processing subsystems.

Output device 208 receives and displays the information received from processing subsystem 206. Preferably, subsystems 202, 204, 206 and 208 may be coupled through a high-speed network.

Figure 3:
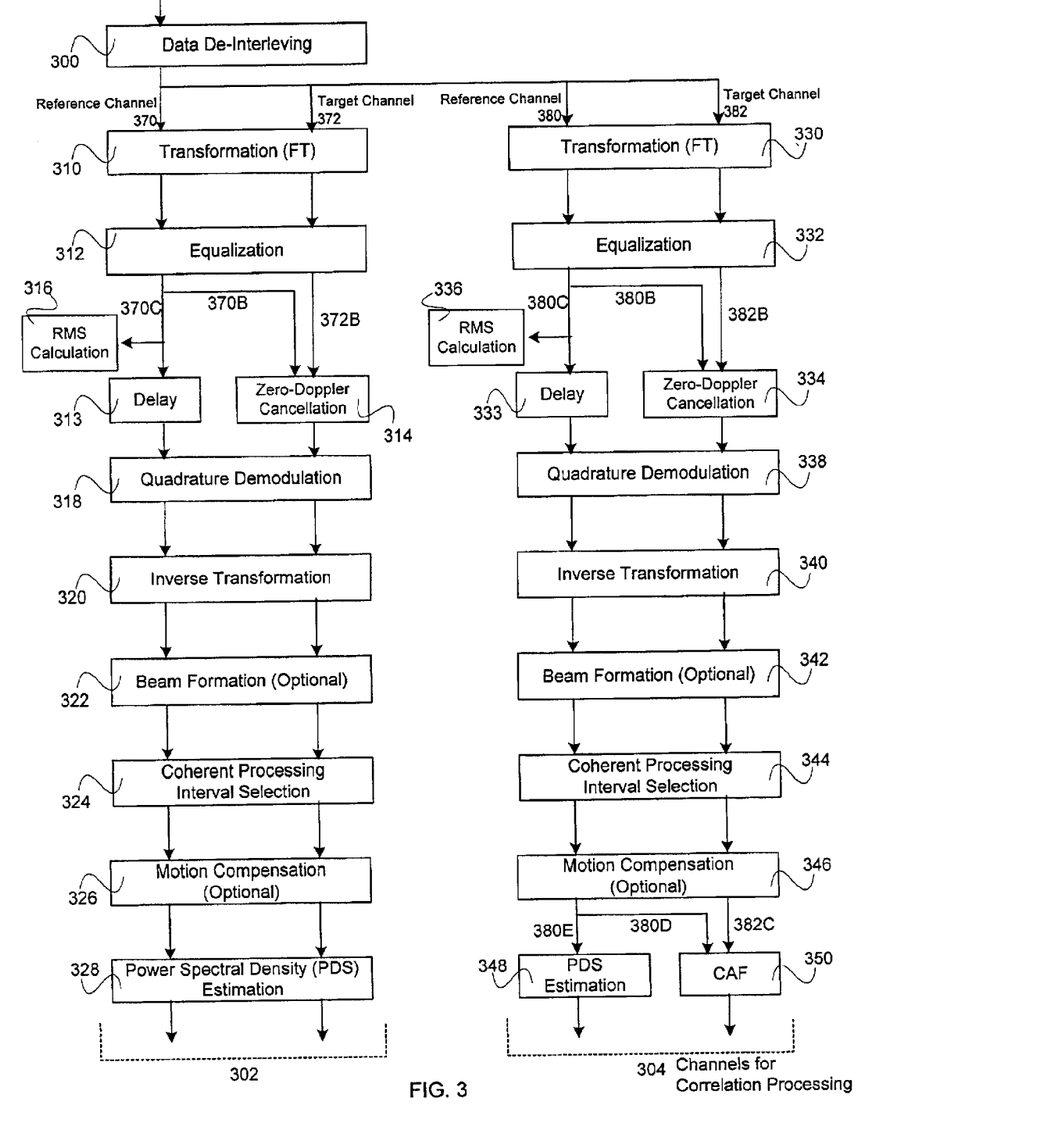
FIG. 3 illustrates a flowchart for pre-detection signal processing in a passive coherent location system in accordance with an embodiment of the present invention.

FIG. 3 depicts a flowchart for signal processing with pre-detection signal processor 240 in accordance with an embodiment of the present invention. Step 300 executes pre-detection signal processor 240 receiving digital samples of target path signal 130 and reference path signal 140 received at the antenna 200 from A/D converter subsystem 204, as blocks of ADC time series data are multiplexed together. The blocks of ADC time series data multiplexed are received by data de-interlever functional element 210.

Data de-interleaving functional element 210 extracts reference signal 140 data and target signal 130 data from the input blocks of time series data as desired by the subsequent filtering operations, and applies an appropriated ADC scale factor for parallel processing. Data de-interleaving functional element 210 passes the signals using two primary parallel paths. The two primary parallel paths address different types of narrowband illuminators. The first path 302, including a reference channel 370 and a target channel 372, shows the flow for zero-bandwidth signals typified by TV carriers. The second path 304, including a reference channel 380 and a target channel 382, depicts the flow for signals having some bandwidth for which correlation processing is generally superior in performance to the direct power spectral density ("PSD") estimation used in the first path.

Referring to step 310 in the first path 302, data transformation functional element 212 receives reference signal 140 data and target signal 130 data through the reference channel 370 and the target channel 372, respectively. Data transformation functional element 212 implements discrete fourier transform ("DFT"), preferably by using fast fourier transform ("FFT") operation. The FFT operation transforms the input data from a time function to a frequency function. Preferably, an overlap-save FFT operation may be implemented to cover all ranges. The overlap-save FFT operation is repeated independently for each time series data of interest, thus providing a unique "save" block and DFT output for each of the target signal data and each of the reference signal data. Preferably, a DFT length, N, may be chosen to be factored into a product of small integers (e.g., 2, 3, 4, or 5) so that an efficient FFT technique may be used to implement the 2N-length DFT.

Referring to step 312, equalization functional element 214 receives the output of data transformation functional element 212 through the reference channel and the target channel. Equalization functional element 214 applies filters to each of reference signal 140 data and target signal 130 data. The filters may minimize amplitude ripple over about a 50 kHz band centered around the carrier frequency of interest, the target signal-to-reference differential group delay that is a difference of the rate of phase shift with respect to frequency between target signal 130 data and reference signal 140 data, and the differential gain that is a difference of a ratio of signal-to-noise ratio and phase errors between the target signals. The filters may be obtained through an off-line calibration procedure. Equalization functional element 214 compensates an intersymbol interference ("ISI") that is an overlapping of successively transmitted signals within a channel due to its dispersion of the frequencies constituting the signal. Equalization functional element 214 minimizes the probability of error by compensating for channel distortion. The equalization procedure may be repeated independently for each time series of the data.

Referring to step 314, zero-doppler cancellation functional element 216 implements an adaptive zero-doppler cancellation ("ZDC"), or a time-domain signal processing operation, to received target signal 130 data via target channel 372B and reference channel 370B that minimizes the portion of reference signal 140 data present in the target signal 130 data. For each RF passband (distinct for each local oscillator ("LO") tuning), the configurable input indicates whether or not ZDC should be performed. If ZDC is to be performed, reference signal 140 is designated as either a single element A/D channel or an ordered list of A/D channels with an associated set of beamforming coefficients. Referring to step 313, a delay may be introduced by a delay element to signals within reference channel 370C.

Referring to step 316, RMS (root mean square) bandwidth calculation functional element 234 receives reference signal 140 data through reference channel 370C and estimates an RMS value of a bandwidth of reference 140 signal data. This value is desired in the calculation of the variance of the delay measurement performed that occurs later in detection and feature extraction processing.

Referring to step 318, quadrature demodulation functional element 218 receives reference data 140 signal from equalization functional element 214 through a delay element and the output of zero-doppler cancellation functional element 216. Quadrature demodulation functional element 218 implements the time-domain signal processing operation schematically depicted in FIG. 5, as disclosed below.

Referring to step 320, inverse transformation functional element 222 accepts target signal 130 data and reference signal 140 data produced by quadrature demodulation functional element 218 and implements an inverse transformation. Preferably, $B/2=N-(M_{EFF}-1)/2$ length blocks of complex-valued time series for the signals of interest may be produced. Each of the target array element signals and the reference signals are independently processed. Preferably, the effective filter length is odd.

Referring to step 322, beam formation functional element 224 accepts target signal 130 data produced by the proceeding functional elements and combines them to form target beams that have selectivity along specific lines of azimuth and elevation. Beam formation function 322 may be an optional step.

Referring to step 324, ("CPI") selection functional element 226 receives target signal 130 and reference signal 140 produced from the preceding functional elements and selects a CPI to accurately time-tag and synchronize detection report data from all receiver nodes within a network. The CPI selection is performed by basing the time-tags on ("GPS") time and selecting CPIs centered on prescribed time instants. This time interval may range from about tens to about hundreds of milliseconds. GPS time is latched periodically from a GPS receiver and associated with the A/D sample nearest in time. With this GPS time mark, all buffered A/D data in memory can be time-tagged accurately using the sampling rate and number of samples from the GPS time mark.

Referring to step 326, motion compensation functional element 228 receives the signals from CPI selection functional element 226 and implements motion compensation by accepting tracker feedback for a target-of-interest ("TOI") and enhancing the detection performance for the TOI by compensating for its motion over the CPI. The motion compensation operation may be performed as one of the processing control options. Motion compensation function element 326 implements the motion compensation when the time difference between the state vector time and the CPI time does not exceed a threshold, $$|t_m - t_0| < \eta_{mor}.$$

When the motion compensation option is exercised, the feedback is the state vector that is provided periodically after the TOI has been identified as such in the tracker function. The state vector feedback is denoted by the vector triplet $$X_{TOI}[t_0] = (\bar{R}_0, \bar{V}_0, \bar{A}_0),$$

where $R_0$, $V_0$, and $A_0$ denote the target's position, velocity, and acceleration vectors at time $t_0$.

Referring to step 328, power spectral density ("PSD") estimation functional element 230 receives target signal 130 and reference signal 140 produced from the preceding functional elements and estimates the power spectral density. In one embodiment, a windowed periodogram is computed as the estimate of the PSD. Other spectral density estimators may be used. Periodogram is based on the discrete Fourier transform. Periodogram displays the presence of a sinusoid near one frequency value as a distinct peak in the spectrum. In one embodiment, the periodogram may be computed according to $$Y[k] = \frac{1}{N}|CDFT_n\{X[n]W[n]\}|^2 \text{ for } k = 0, 1, \ldots, N-1,$$

where the data within the CPI is denoted as $X[n]$, $n=0, 1, \ldots, N-1$ and the window is denoted as $W[n]$, $n=0, 1, \ldots, N-1$.

The window function is selected via the configuration parameter $WIN_{DOP}$.

The Hamming window and the Blackman window may be used. The Hamming window may be defined by $$W[n] = 0.54 - 0.46\cos\left(\frac{2n\pi}{N-1}\right) \text{ for } n = 0, 1, \ldots, N-1$$

The power gains of the Hamming window are −5.4 dB for a constant amplitude signal and −4.0 dB for a white noise sequence.

The Blackman window may be defined by $$W[n] = a_0 - a_1\cos\left(\frac{2n\pi}{N-1}\right) + a_2\cos\left(\frac{4n\pi}{N-1}\right) \text{ for } n = 0, 1, \ldots, N-1$$

where $a_0=0.42323$, $a_1=0.49755$, $a_2=0.07922$.

The power gains of the Blackman window are −7.5 dB for a constant amplitude signal and −5.1 dB for a white noise sequence. In the detection processing step, the total noise power is the average of the periodogram components, where the average is taken over the bins classified as "noise bins".

For each link, the power spectral density is estimated after the signals are modulated to compensate for the motion. The detector accepts detection reports having doppler within a selectable interval about the predicted doppler for the target for each link "k", i.e., whenever $$|f_{d,k,m} + \eta_i^{-1}\bar{V}_m \cdot \bar{B}_{k,m}| < \lambda_{mow}.$$

Separately, at the same time when reference signal 140 and target signal 130 is processed in first path 302, the signals are processed in second path 304 for the correlation processing, as depicted in FIG. 3. The signal processing steps in second path 304 are disclosed below.

Referring to step 330 of second path 304, data transformation functional element 212 receives reference signal 140 data and target signal 130 data through reference channel 380 and target channel 382, respectively. Data transformation functional element 212 implements discrete Fourier transform, preferably by using a fast Fourier transform operation, required by the subsequent filtering operations, as disclosed above.

Referring to step 332, equalization functional element 214 receives the output of data transformation functional element 212 through reference channel 380 and target channel 382. Equalization functional element 214 applies filters to each of reference signal 140 data and target signal 130 data to compensate for channel distortion. The equalization procedure may be repeated independently for each time series of the data.

Figure 5:
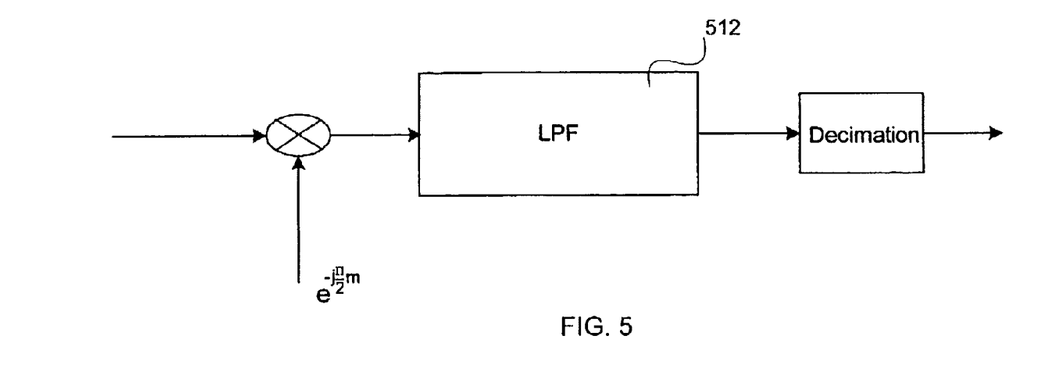
FIG. 5 illustrates a schematic view of a quadrature demodulation device in accordance with an embodiment of the present invention.

Referring to step 334, zero-doppler cancellation functional element 216 implements an adaptive zero-doppler cancellation operation schematically depicted in FIG. 5 to received target signal 130 data to minimize the portion of reference signal 140 data present in target signal 130 data via target channel 382B and reference channel 380B. Referring to step 333, a delay may be introduced by a delay element to signals within reference channel 380C.

Referring to step 336, root mean square bandwidth calculation functional element 234 receives reference signal 140 data through reference channel 380C and estimates the RMS value of a bandwidth of reference signal 140 data. This value is desired in the calculation of the variance of the delay measurement performed in subsequent detection and feature extraction processing.

Referring to step 338, quadrature demodulation functional element 218 receives reference signal 140 from equalization function element 214 through the delay element of step 333 and the output of zero-doppler cancellation functional element 216. Quadrature demodulation functional element 218 implements the time-domain signal processing operation schematically disclosed with regard to FIG. 5.

Referring to step 340, inverse transformation functional element 222 accepts target signal 130 data and reference signal 140 data produced by quadrature demodulation functional element 218 and implements an inverse transformation operation. Preferably, $B/2=N-(M_{EFF}-1)/2$ length blocks of complex-valued time series for the signals of interest may be produced. Each of the target array element signals and the reference signal are independently processed. Preferably, the effective filter length is odd.

Referring to step 342, beam formation functional element 224 accepts target signal 130 data produced by the proceeding functional elements and combines them to form target beams which have selectivity along specific lines of azimuth and elevation. The beam formation function may be optional.

Referring to step 344, CPI selection functional element 226 receives target signal 130 and reference signal 140 produced in the preceding functional elements and selects a CPI to accurately time-tag and synchronize detection report data from all receiver nodes within a network, as disclosed above. Referring to step 346, motion compensation functional element 228 receives the signals from CPI selection functional element 226 and implements motion compensation by accepting tracker feedback for a target-of-interest ("TOI") and enhancing the detection performance for the TOI by compensating for its motion over the CPI. The motion compensation operation may be optional.

Referring to step 350 in second path 304, cross ambiguity function formation estimation functional element 232 receives target signal 130 and reference signal 140 produced from the preceding functional elements through a target channel 380C and a reference channel 380D, respectively. Cross ambiguity function formation estimation functional element 232 computes a cross-ambiguity over the CPI of T samples for the each of the target signals. The cross ambiguity function extracts the commonalties between two signals or systems to determine the existence or structure of these commonalties. The coherent processing interval may be overlapped by some factor, $1-1/\rho$, $\rho=2, 4$, and the like.

Separately, in step 348, power spectral density estimation functional element 230 receives reference signal 140 produced from preceding functional elements through a reference channel 382C and estimates the power spectral density.

Figure 4:
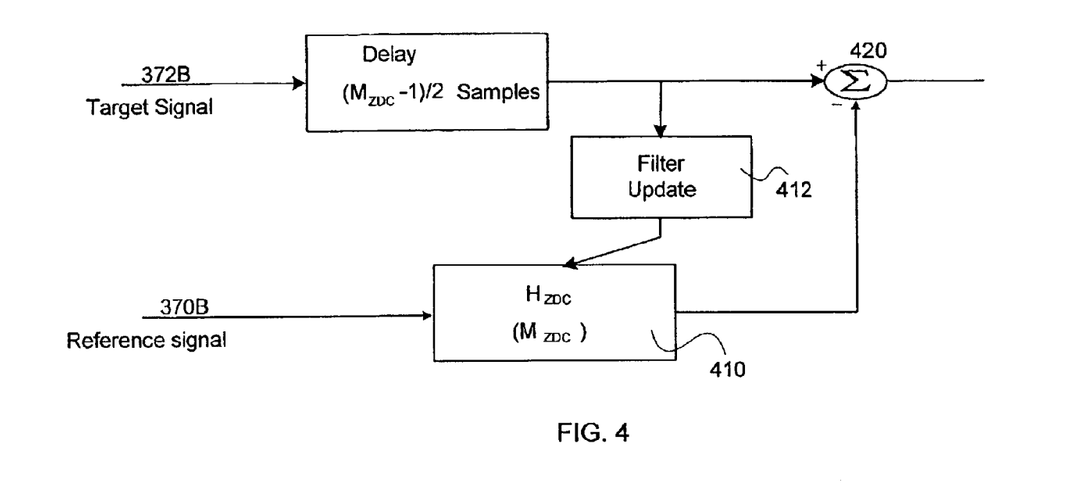
FIG. 4 illustrates a schematic view of a zero-doppler cancellation device in accordance with an embodiment of the present invention.

FIG. 4 depicts an adaptive zero-doppler cancellation device within pre-detection signal processor 240 in accordance with an embodiment of the present invention. Zero-doppler cancellation functional element 216 receives time series target signal 130 data and time series reference signal 140 data through a reference channel 370B and a target channel 372B, respectively. Target channel 372B routes target signal 130 through delay element 404. The first received reference signal data is filtered with respect to the first target signal data received by filter 410. The filtered first reference signal data received is combined with the first received target signal data to minimize the portion of the first reference signal data received present in the first received target signal data. Then, filter update functional element 412 updates filter 410 with respect to the second received target signal data by comparing filter 410 with the second received target signal data. The second received reference signal data through reference channel 370B is filtered with filter 410 that is updated with respect to the second received target signal data. Then, the filtered second received reference signal data is combined with the second target signal data. Filter 410 is updated continuously by filter update functional element 412 with respect to each of the time series of target signal 130 data received through target channel 372B by comparing filter 410 to the each of the time series. The disclosed zero-doppler cancellation operation may be repeated independently for each element time series. Reference signal 140 data is adaptively filtered. Each of the filtered times series of reference signal 140 data is combined with the each of the time series of target signal 130 data. Filter 410 preferably includes an adaptive Wiener filter. By applying the disclosed adaptive zero-doppler cancellation, more accurate target signal data for a moving target be generated.

FIG. 5 depicts a schematic view of a quadrature demodulation device in accordance with an embodiment of the present invention. The phase of the real-valued signal data may be shifted by multiplying the data with $$\exp(-j\frac{\pi}{2},m).$$

The real-valued signal data that has a center frequency of $\pi/2$ is demodulated, filtered with a low-pass filter 512, such as a ("FIR LPF"), and decimated to produce complex-valued signal data. The real-valued input times series data is demodulated, filtered and decimated to produce a complex, or quadrature, representation of the time series that is centered at zero radians per sample and has a reduced sample rate. Decimation element 514 may decimate the input time series data.

By finding a complex envelope, the real-valued signal data, which is a low-pass function with the in-phase component and the quadrature component in the quadrature representation, analysis of a band-pass system, that is complicated by the presence of the multiplying factor exp $$\exp\left(-j\frac{\pi}{2}m\right)$$

is replaced by an equivalent, but simpler, low-pass analysis that retains the essence of the filtering processes. The demodulating, filtering and decimating depicted in FIG. 5 may be combined into a signal using more memory efficient operation. In addition, if the effective filter length is odd, the phase accumulator may assume values of multiples of π/2, so that the multiplication by the phase accumulator can be implemented as a sign change. Quadrature demodulation functional element 218 implements the signal processing operation in FIG. 5 to the received target signal data and the received reference signal 140 data.

Figure 6:
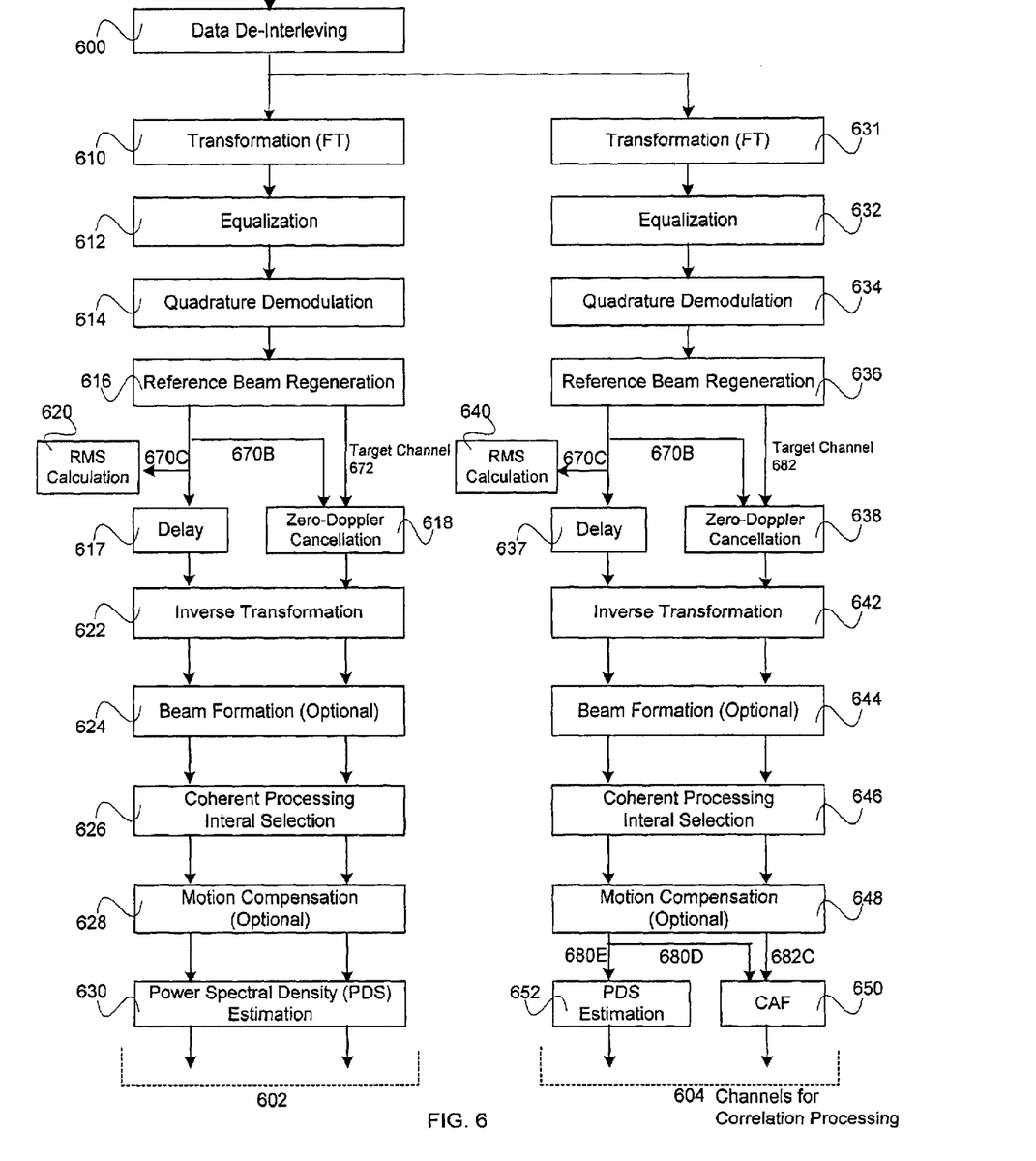
FIG. 6 shows a flowchart for pre-detection signal processing in the passive coherent location system in accordance with another embodiment of the present invention.

FIG. 6 depicts a flowchart for pre-detection signal processing in accordance with another embodiment of the present invention. The signal processing operations disclosed below may occur using pre-detection processor 240. Pre-detection processor 240, however, may use an alternate approach of constant modulus reference regeneration as disclosed in U.S. Pat. No. 5,604,503, which is hereby incorporated by reference, in the absence of a reference channel.

Referring to step 600, pre-detection signal processor 240 receives digital samples of target path signal 130 and reference path signal 140 from A/D converter subsystem 204, as blocks of ADC time series data multiplexed together. The blocks of ADC time series data are received by data de-interlever functional element 210. According to the embodiments disclosed with reference to FIG. 6, data de-interleaving functional element 210 should not extract reference signal 140 data and target signal 130 data from the input signal data blocks of time series data. Data de-interleaving functional element 210 passes the signals using two parallel paths, first path 602 and second path 604. First path 602 depicts the flow for zero-bandwidth signals typified by TV carriers. Second path 604 depicts the flow for signals having some bandwidth for which correlation processing is superior in performance to the direct "PSD" estimation used in first path 602.

The signal processing steps in first path 602 are disclosed below. Referring to step 610, data transformation functional element 212 receives the input signal with target signal 130 data and reference signal 140 data through first path 602. The data may be received over target channel 672 and reference channel 670, respectively. Data transformation functional element 212 implements discrete Fourier transform operations, preferably by using fast Fourier transform ("FFT") operations, desired by the subsequent filtering operations. The FFT operations transform the input data from a time function to a frequency function. Preferably, an overlap-save FFT operation may be implemented to cover all possible ranges of frequencies. The overlap-save FFT operation is repeated independently for each time series data of interest, thus providing an unique "save" block and "DFT" output for the input signal data. Preferably, a DFT length, N, may be chosen to be factored into a product of small integers (e.g., 2, 3, 4, or 5) so that an efficient FFT technique may be used to implement a 2N-length DFT.

Referring to step 612, equalization functional element 214 receives the output of data transformation functional element 212 and applies unique filters to the output. Referring to step 614, quadrature demodulation functional element 218 receives the output of equalization functional element 214 and implements the time-domain signal processing operations disclosed with reference to FIG. 5, to produce a complex representation of the time series that is centered at zero radians per sample.

Referring to step 616, reference beam regeneration functional element 220 receives the output of the quadrature demodulation functional element 218 and estimates reference signal 140 (i.e., the D-P signal) and target signal 130 (i.e., the T-P signal) as disclosed in U.S. Pat. No. 5,604,503, which is hereby incorporated by reference.

Referring to step 618, zero-doppler cancellation functional element 216 receives target signal 130 and reference signal 140 estimated by reference beam regeneration functional element 220 through a target channel 672B and a reference channel 670B, respectively. ZDC functional element 216 implements the time-domain signal processing operations disclosed above with reference to FIG. 4. Referring to step 617, a delay may be introduced by a delay element to signals within reference channel 670C.

Referring to step 620, RMS bandwidth calculation functional element 234 estimates the bandwidth of reference signal 140 within reference channel 670C. The estimated value may be desired in the calculation of the variance of the delay measurement performed in subsequent detection and feature extraction processing.

Referring to step 622, the data of reference signal 140 and target signal 130 are received at inverse transformation functional element 222. As disclosed above, inverse transformation functional element 222 may accept the N-length DFTs of the target array element signals produced by quadrature demodulation functional element 218, as disclosed above, and the N-length DFTs of reference signal 140. Inverse transformation functional element 222 produces $B/2=N-(M_{EFF}-1)/2$ length blocks of complex-valued time series for signals 130 and 140. The target array element signals and reference signal 140 may be processed independently as disclosed above. Preferably, the effective length filter length is odd.

Referring to step 624, beamformation functional element 224 accepts the array element signals of target signal 130 or reference signal 140 produced by the preceding functional elements. Beamformation functional element 224 combines the array element signals to form signals that have selectivity along specific lines of azimuth and elevation. This step may be optional in the signal processing operations.

Referring to step 626, CPI selection functional element 226 may latch periodically global positioning system ("GPS") time for a GPS receiver and associate the time with the A/D sample nearest in time. Using the GPS time mark, buffered A/D data in memory coupled to pre-detection processor 240 may time-tagged accurately using the sample rate and the number of samples from the mark. Thus, CPI selection functional element 226 may time-tag and synchronize detection report data from all receiver nodes within a network by basing the time-tags on GPS time and selecting CPIs centered on prescribed time instants.

Referring to step 628, motion compensation functional element 228 accepts tracker feedback for the TOI and enhances the detection performance for the TOI by compensating for its motion over the CPI. The feedback from step 628 may be the state vector that is provided periodically after the TOI has been identified as such in the tracker function, as disclosed with reference to step 326 in FIG. 3. Step 628 may be optional. Referring to step 630, power spectral density functional element 230 computes a windowed periodogram as the estimate of the power spectral density ("PSD"), as disclosed above with reference to step 328 in FIG. 3.

The processing steps for second path 604 receive reference signal 140 in reference channel 680 and target signal 130 in target channel 682. Second path 604 follows the order of first path 602, except for a few variations. Referring to step 631, data transformation functional element 212 implements discrete Fourier transform operations, preferably by using fast Fourier transform operations, desired by the subsequent filtering operations. The FFT transforms the input data from a time function to a frequency function. Preferably, an overlap-save FFT operation may be implemented to cover all possible ranges of frequencies. The overlap-save FFT operation is repeated independently for each time series data of interest, thus providing a unique "save" block and "DFT" output for the input signal data. Preferably, a DFT length, N, may be chosen to be factored into a product of small integers (e.g., 2, 3, 4, or 5) so that an efficient FFT technique may be used to implement a 2N-length DFT.

Referring to step 632, equalization functional element 214 receives the output of data transformation functional element 212 and applies unique filters to the output. Referring to step 634, quadrature demodulation functional element 218 receives the output of equalization functional element 214 and implements the time-domain signal processing operations disclosed with reference to FIG. 5, to produce a complex representation of the time series that is centered at zero radians per sample.

Referring to step 636, reference beam regeneration functional element 220 receives an output of quadrature demodulation functional element 218 and estimates reference signal 140 (i.e., the D-P signal) and target signal 130 (i.e., the T-P signal) as disclosed in U.S. Pat. No. 5,604,503, which is hereby incorporated by reference.

Referring to step 638, zero-doppler cancellation functional element 216 receives target signal 130 and reference signal 140 estimated by reference beam regeneration functional element 220 through a target channel 682B and a reference channel 680B, respectively. ZDC functional element 216 implements the time-domain signal processing operations disclosed above with reference to FIG. 4. Referring to step 637, a delay may be introduced by a delay element to signals within reference channel 680C.

Referring to step 640, RMS bandwidth calculation functional element 234 estimates the bandwidth of reference signal 140 within reference channel 680C. The estimated value may be desired in the calculation of the variance of the delay measurement performed in subsequent detection and feature extraction processing.

Referring to step 622, the data of reference signal 140 and target signal 130 are received at inverse transformation functional element 222. As disclosed above, inverse transformation functional element 222 may accept the N-length DFTs of the target array element signals produced by quadrature demodulation functional element 218, as disclosed above, and the N-length DFTs of reference signal 140. Inverse transformation functional element 222 produces $B/2=N-(M_{EFF}-1)/2$ length blocks of complex-valued time series for signals 130 and 140. The target array element signals and reference signal 140 may be processed independently as disclosed above. Preferably, the effective length filter length is odd.

Referring to step 644, beamformation functional element 224 accepts the array element signals of target signal 130 or reference signal 140 produced by the preceding functional elements. Beamformation functional element 224 combines the array element signals to form signals that have selectivity along specific lines of azimuth and elevation. This step may be optional in the signal processing operations.

Referring to step 648, motion compensation functional element 228 accepts tracker feedback for the TOI and enhances the detection performance for the TOI by compensating for its motion over the CPI. The feedback from step 648 may be the state vector that is provided periodically after the TOI has been identified as such in the tracker function, as disclosed with reference to step 326 in FIG. 3. Step 648 may be optional.

Referring to step 650, cross ambiguity function ("CAF") formation estimation functional element 232 receives target signal 130 and reference signal 140 produced from the preceding functional elements through a target channel 682C and a reference channel 680D, respectively. CAF formation estimation functional element 232 computes a cross-ambiguity over the CPI of T samples for each of the target signals, such as target signal 130. The CAF extracts the commonalities between two signals or systems to determine the existence or structure of these commonalities. The CPI may be overlapped by some factor, such as $1-1/\rho$, $\rho=2$, 4, and the like. Referring to step 652, power spectral density functional element 230 computes a windowed periodogram as the estimate of the power spectral density ("PSD"), as disclosed above with reference to step 328 in FIG. 3.

The filtering operations performed prior to beamformation, such as equalization, zero-doppler cancellation, quadrature demodulation and inverse transformation, may be implemented using overlap-save fast convolution operations in order for contiguous blocks of input time series data to produce contiguous blocks of output time series data just prior to the selection of the CPI and formation of the estimated PSD and CAF functions. The overlap-save filtering operations may equalize the target array element signals and minimize the amount of reference signal in each target array element signal.

Additionally, the overlap-save filtering operations may produce a complex representation of the target element signal data that is centered around zero radians per sample. The disclosed functional elements operate in real-time. As can be appreciated, pre-detection signal processing in the present invention may cancel interfering signal energy from the target array element. Additionally, the target array element signals may be transformed into directed beams along specified azimuth angles.

It will be apparent to those skilled in the art that various modifications and variations can be made in the disclosed embodiments of the present invention without departing from the spirit or scope of the invention. Thus, it is intended that the present invention covers the modifications and variations of this invention provided that they come within the scope of any claims and their equivalents.

What is claimed is:

1. A method for narrowband pre-detection signal processing in passive coherent location applications comprising:
  receiving a first reference signal and a first target signal;
  filtering the first reference signal with respect to the first target signal using a filter to form a first output reference signal;
  combining the first output reference signal with the first target signal to form a first output target signal;
  receiving a second reference signal and a second target signal;
  updating the filter with respect to a difference between the first target signal and the second target signal;
  filtering the second reference signal using the updated filter to form a second output reference signal; and
  combining the second output reference signal with the second target signal to form a second output target signal.

2. The method according to claim 1, wherein the first target signal and the second target signal are reflected from a moving target.

3. The method according to claim 1, wherein the filter includes an adaptive Wiener filter.

4. The method according to claim 1, wherein the filtering steps reduce a portion of the first and second reference signals from the first and second target signals.

5. The method according to claim 1, wherein the method further includes extracting the first reference signal and the first target signal from a first input signal and the second reference signal and the second target signal from a second input signal.

6. The method according to claim 1, wherein the method further includes filtering the first and second target signals and the first and second reference signals to compensate for channel distortion.

7. The method according to claim 1, wherein the method further includes calculating a root mean square bandwidth of the first reference signal.

8. The method according to claim 1, wherein the method further includes demodulating and producing complex-valued representations of the first and second reference signals and the first and second output target signals.

9. The method according to claim 8, wherein the method further includes decimating the complex-valued representations of the first and second reference signals and the first and second output target signals.

10. The method according to claim 1, wherein the method further includes estimating the first reference signal and the first target signal from a first input signal and estimating the second reference signal and the second target signal from a second input signal.

11. The method according to claim 10, wherein estimating the first reference signal includes estimating a magnitude of the reference signal from the first input signal.

12. The method according to claim 10, wherein the method further includes demodulating and producing a complex-valued representation of the first input signal before estimating the first reference signal and the first target signal.

13. The method according to claim 12, wherein the method further includes decimating the complex-valued representation of the first input signal.

14. The method according to claim 1, wherein the filtering and combining occurs in two paths simultaneously.

15. The method according to claim 14, wherein the method further includes selecting a coherent processing interval in the each of the paths.

16. The method according to claim 15, wherein the method further includes compensating for motion by accepting tracker feedback for a target and compensating for motion over the coherent processing interval in the each of the paths.

17. The method according to claim 16, wherein the method further includes estimating a power spectral density after the motion compensation.

18. The method according to claim 14, wherein the method further includes estimating a power spectral density for the each of the paths and estimating a cross ambiguity function for one of the paths, simultaneously.

19. A system for narrowband pre-detection signal processing in passive coherent location applications, comprising:

means for receiving a first reference signal and a first target signal;

means for filtering the first reference signal with respect to the first target signal using a filter to form a first output reference signal;

means for combining the first output reference signal with the first target signal to form a first output target signal;

means for receiving a second reference signal and a second target signal;

means for updating the filter with respect to a difference between the first target signal and the second target signal;

means for filtering the second reference signal using the updated filter to form a second output reference signal; and means for combining the second output reference signal with the second target signal to form a second output target signal.

* * * * *